United States Patent [19]

Kim

[11] Patent Number: 5,443,577
[45] Date of Patent: Aug. 22, 1995

[54] AUTOMATICALLY PUT-ON AUTOMOBILE SAFETY BELT

[76] Inventor: Jong K. Kim, 56-5 2Street Soosung Soosung-Koo, Taegu City, Rep. of Korea

[21] Appl. No.: 239,396

[22] Filed: May 6, 1994

[30] Foreign Application Priority Data

Dec. 10, 1993 [KR] Rep. of Korea .................. 93-27405

[51] Int. Cl.$^6$ ............................................. B60R 22/04
[52] U.S. Cl. .................... 280/802; 280/803; 297/468
[58] Field of Search ............. 280/802, 803, 807, 808; 297/468, 469, 483

[56] References Cited

U.S. PATENT DOCUMENTS

| | | | |
|---|---|---|---|
| 3,976,305 | 8/1976 | Fieni | 280/802 |
| 4,222,586 | 9/1980 | Takada | 280/803 |
| 4,382,614 | 5/1983 | Kubota | 280/802 |
| 4,796,915 | 1/1989 | Kaurich et al. | 280/802 |
| 5,183,290 | 2/1993 | Chung | 280/802 |

FOREIGN PATENT DOCUMENTS 1398208 of 1915 United Kingdom ............... 280/802

Primary Examiner—Brian L. Johnson
Assistant Examiner—Christopher Ellis
Attorney, Agent, or Firm—Birch, Stewart, Kolasch & Birch

[57] ABSTRACT

The invention provides an automatically put-on automobile safety belt. Conventionally, it is very troublesome to put on the safety belt, because it has to be manipulated manually. The present invention overcomes these disadvantages. That is, the automatically put-on safety belt includes: a winder for winding a belt 1; a fixed member for securing the other end of the belt; a buckle for being coupled with a hook; and the above three elements constituting the three securing points for the belt. Here, the winder is installed on the automobile floor at the rear of a seat; the fixed member is installed on the automobile floor at a side of the seat; the buckle is installed on the lower edge of a door; a guide ring 8 supported by an elastic rod is installed over the top of the seat; and the hook is provided with guide rings supported by arcuate elastic rods and. Thus the belt is secured to the three points, so that the belt should be automatically put on a rider upon closing the door, and that the rider should be able to easily get in and out of the car upon opening the door.

3 Claims, 3 Drawing Sheets

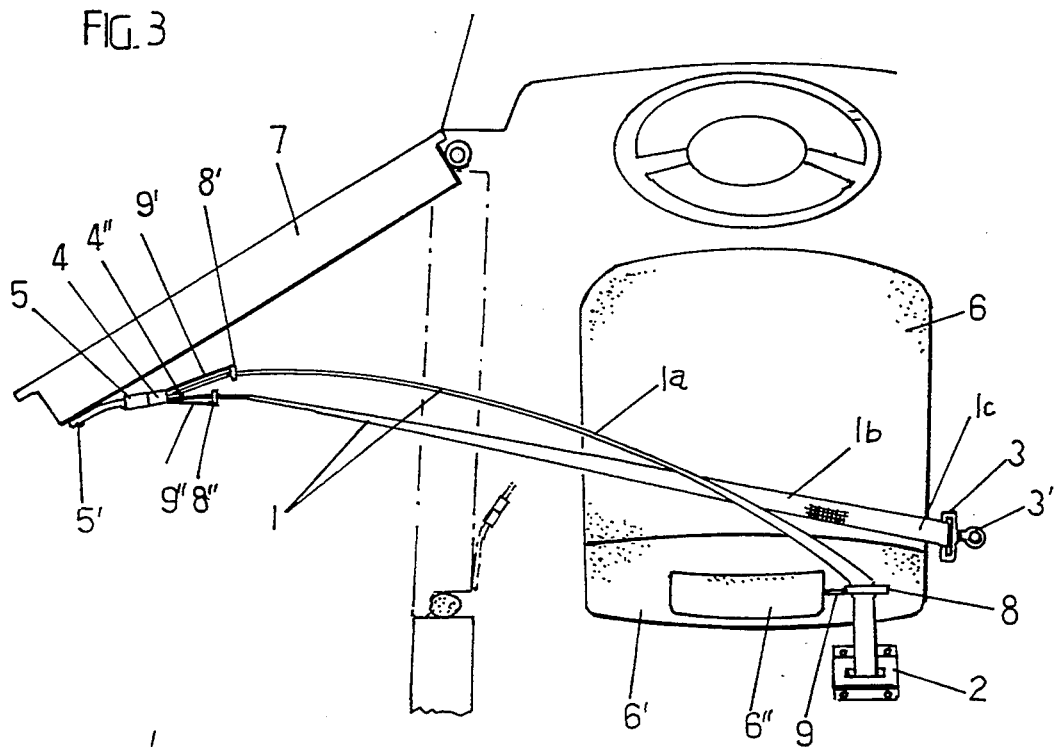
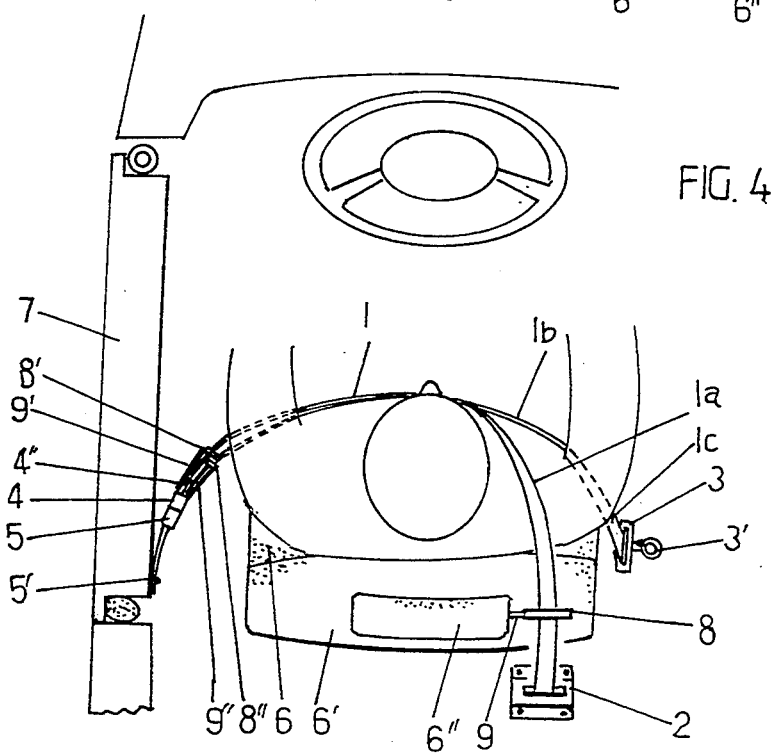

AUTOMATICALLY PUT-ON AUTOMOBILE SAFETY BELT

FIELD OF THE INVENTION

The present invention relates to an improvement of the existing three-point safety belt. In particular, the present invention relates to an automatically put-on automobile safety belt, in which a winder of the belt and a fixed member are fixed respectively on the rear of the seat and at a side of the seat (on the floor), and a buckle for being coupled with a hook is fixed on the lower edge of a door, so that the safety belt should be disposed on the front of the seat. Thus, if the door is opened, the safety belt is also spread outward and toward the entrance, so that a person can enter into the car, and that the safety belt should be put on the person in an automatic manner, thereby improving the safety and the convenience.

BACKGROUND OF THE INVENTION

In the conventional three-point automobile safety belt, a winder and a fixed member are fixed at two points on the door post. Meanwhile, a buckle for being coupled with a hook is fixed on an inner side of the seat. Therefore, when the safety belt is not used, the hook is detached from the buckle, and the safety belt is suspended vertically from the door post, i.e., from the fixed member and the winder. When the safety belt is to be used, the hook is pulled to couple it with the buckle, thereby putting on the safety belt. Thus the procedure of putting on the safety belt is very troublesome, and therefore, passengers of an automobile frequently neglect to put on the safety belt, in spite of the fact that the law requires passengers of an automobile to put on the safety belts. Consequently, when an accident occurs, the result is very disastrous.

SUMMARY OF THE INVENTION

The present invention is intended to overcome the above described problems of the conventional safety belt.

Therefore it is the object of the present invention to provide an automatically put-on safety belt, in which, when a rider enters into the car, and when the door of the car is closed, the safety belt is automatically put on, thereby improving the safety of the car rider.

In achieving the above object, the improved three-point safety belt according to the present invention is characterized in that: a winder for winding the belt and a fixed member for securing the belt are fixed respectively on the car floor at the rear of the seat and on the floor at a side of the seat respectively; and a buckle for being coupled with a hook is fixed on the lower edge of a door; a belt guide ring is provided above the upper portion of the seat by supporting it with an elastic supporting rod; and guide rings for the hook are also supported with arcuate elastic rods, thereby disposing the safety belt over the seat by securing the belt on the three points.

If the door is open, a rider can easily get in and get out of the car, while, if the rider sits down on the seat and closes the door, the safety belt is automatically put across the chest and the lower belly of the rider. Thus without any troublesome manipulations, the rider can automatically put on the safety belt, so that safety should be ensured during the ride.

BRIEF DESCRIPTION OF THE DRAWINGS

The above object and other advantages of the present invention will become more apparent by describing in detail the preferred embodiment of the present invention with reference to the attached drawings in which:

FIG. 3 is an exemplary plan view showing a state with the door open;

FIG. 4 is an exemplary plan view showing a state with the safety belt put on; and FIG. 5 is a perspective view showing a state in which the safety belt is put on.

DESCRIPTION OF THE PREFERRED EMBODIMENT

Figure 1:
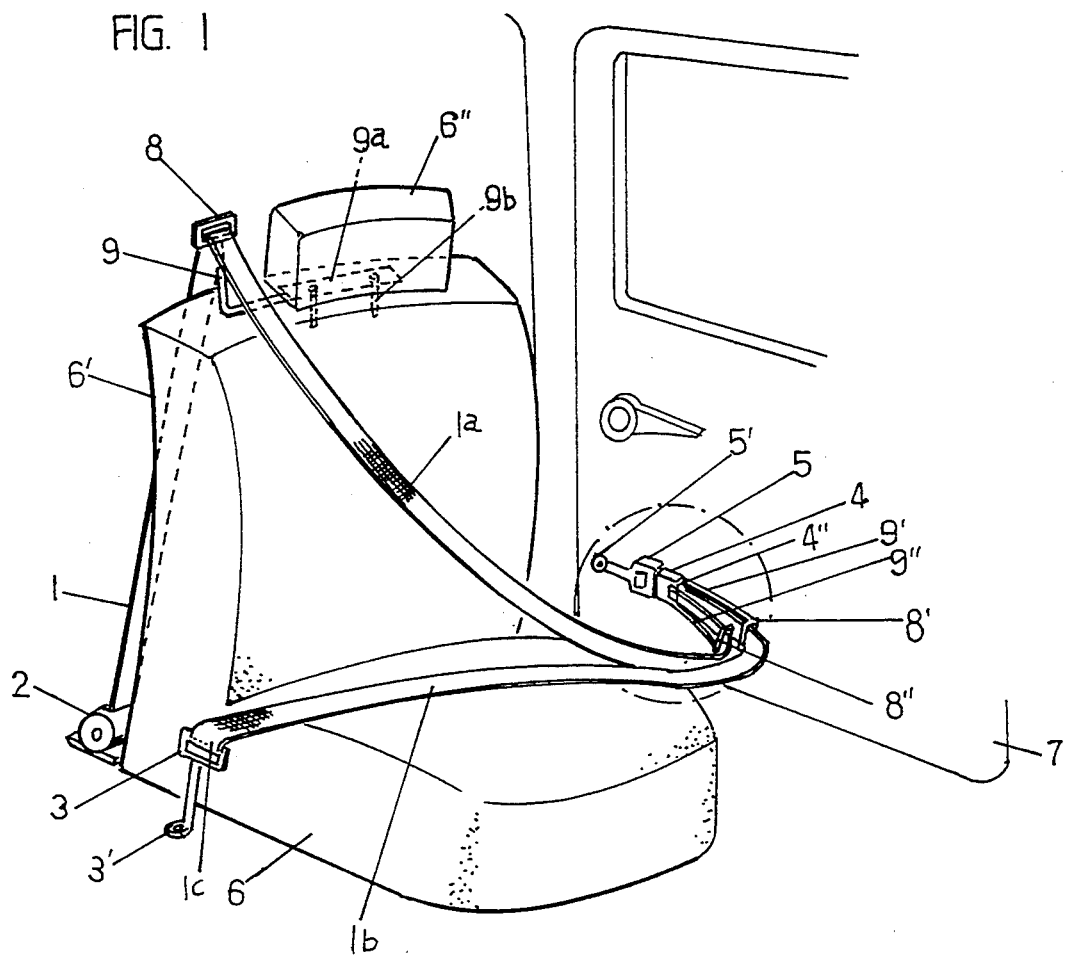
FIG. 1 is a perspective view of the device according to the present invention.
Figure 2:
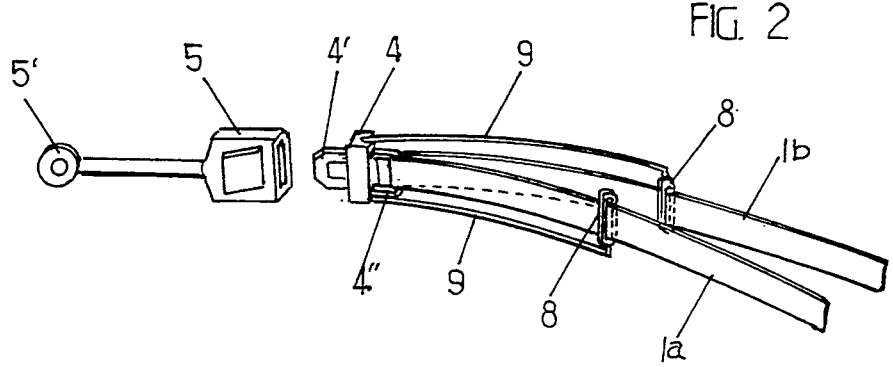
FIG. 2 is a detailed illustration of the portion A of FIG. 1.
Figure 5:
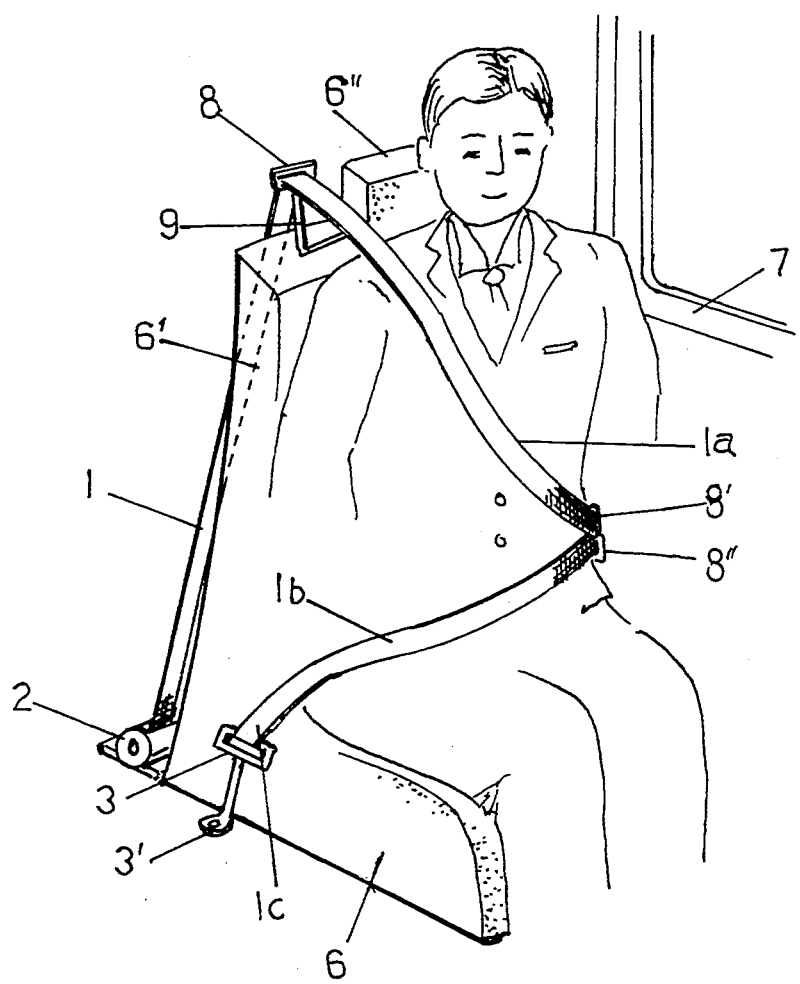

The safety belt includes: a winder 2 for winding a belt 1 which includes a chest portion 1a and a lap portion 1b; a fixed member 3 for securing an end portion 1c of the belt 1; and a buckle 5 for being coupled with a hook 4. The winder 2 is secured on the automobile floor at the rear of a seat 6. The seat 6 includes a seat back 6' and a head rest 6". The fixed member 3 is secured on the automobile floor by a securing portion 3' at a side of the seat 6 near the winder 2. The buckle 5 for being coupled with the hook 4 is installed on the lower edge of a door 7 in the same height as that of the seat 6. The buckle 5 is secured by a securing portion 5'. Thus the buckle 5 is coupled with the hook 4, so that the belt 1 should be connected to the three points. Further, as an auxiliary means, a guide ring 8 is provided over the top of the back of the seat by supporting it with an elastic rod 9. The hook 4 is provided with a guide ring 4" for guiding the belt 1. Further, the hook 4 is also provided with guide rings 8' and 8" by supporting them with arcuate elastic rods 9' and 9". Thus the belt which is connected from the buckle 5 to the two other points is made to be spread from the back of the seat 6 to some degree.

In the device of the present invention as shown in FIG. 1, the belt 1 unwound from the winder 2 is connected through the guide ring 8 of the upper portion of the back of the seat 6 to the hook 4 (coupled with the buckle 5), and is further connected to the fixed member 3. Thus the belt 1 is secured at the three points and passes the front space of the seat 6. Further, the belt 1 passes through the guide rings 8' and 8" of the elastic rods 9' and 9" so that the belt 1 may keep a gap with the front face of the back of the seat 6. Therefore, when a rider gets in or out of the car, a convenience is ensured.

As shown in FIG. 3, if the door 7 is opened, the portion of the belt 1 which is secured on the buckle 5 is spread so as to provide a wide gap. In this state, a rider enters into the car, sits down on the seat 6, and closes the door 7, so that the three points consisting of the winder 2, the fixed member 3 and the buckle 5 should be disposed at the rear side of the rider. Therefore, the belt 1 is put on the rider along the chest and the lower belly of the rider in an automatic manner.

If the door 7 is opened, the belt 1 moves forward from the seat 6 as shown in FIG. 3, and therefore, the rider has only to get out of the car.

The three securing points for the belt 1 are disposed opposite to those of the conventional safety belt. That is, the winder and the fixed member are installed on the car floor at the rear of the seat and at a side of the seat respectively, while the buckle for being coupled with the hook is installed on the lower edge of the door. Thus the belt is secured at the three points, and if the door is opened, the belt is spread forward from the seat 6, so that the rider should be able to easily get in and get out of the car. When the rider sits on the seat, if the door 7 is closed, then the belt 1 is automatically put on the rider.

According to the present invention, the troublesomeness of the method of the conventional belt is overcome, and a convenience is ensured.

What is claimed is:

1. An automatically put-on safety belt for a vehicle having at least one seat and a door adjacent said seat, comprising:
   a winder for winding a safety belt;
   a fixed member for securing an end of said safety belt;
   a hook supported on the safety belt;
   a buckle for being coupled with said hook;
   wherein said winder, said fixed member and the buckle and hook coupling constitute three securing points for said safety belt;
   wherein said winder is installed behind said seat; said fixed member is installed at a side of said seat; said buckle is installed on a lower portion of said door; a first guide ring is installed over a top of said seat for guiding said safety belt; said hook is provided with second and third guide rings supported by elastic rods, whereby said safety belt can be guided therethrough;
   whereby said belt is secured to the three securing points, so that said belt is automatically put on a passenger upon closing said door.

2. The automatically put-on safety belt of claim 1, wherein said first guide ring is supported by an elastic rod.

3. The automatically put-on safety belt of claim 2, wherein said winder and said fixed member are installed on a floor of the vehicle.

* * * * *